(No Model.)

J. KERNS.
HOSE COUPLING.

No. 578,150.　　　　　　　　　Patented Mar. 2, 1897.

WITNESSES:
Dorr Twitchell
J. W. Hanaford

INVENTOR:
J. Kerns
BY Munn & Co
ATTORNEYS.

UNITED STATES PATENT OFFICE.

JOHN KERNS, OF NEW YORK, N. Y.

HOSE-COUPLING.

SPECIFICATION forming part of Letters Patent No. 578,150, dated March 2, 1897.

Application filed December 27, 1895. Serial No. 573,445. (No model.)

*To all whom it may concern:*

Be it known that I, JOHN KERNS, of the city, county, and State of New York, have invented a new and Improved Hose-Coupling, of which the following is a full, clear, and exact description.

My invention relates to couplings for hose, more particularly for fire-hose, and has for its object to provide a simple, effective, and durable coupling the two sections of which may be quickly and easily connected and so that leakage at the joint will be prevented.

The invention consists in certain novel features of construction and combinations of parts of the hose-coupling, all as hereinafter fully described and claimed.

Reference is to be had to the accompanying drawings, forming a part of this specification, in which similar letters of reference indicate corresponding parts in all the figures.

Figure 1:
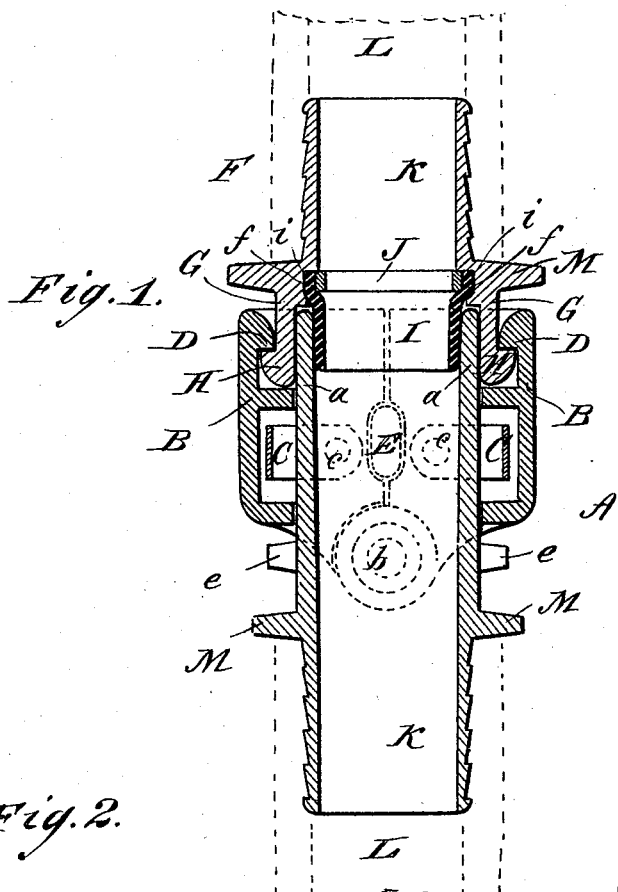
Figure 2:
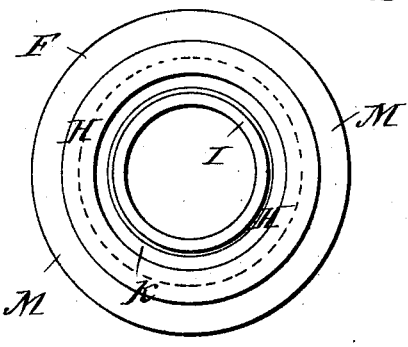
Figure 3:
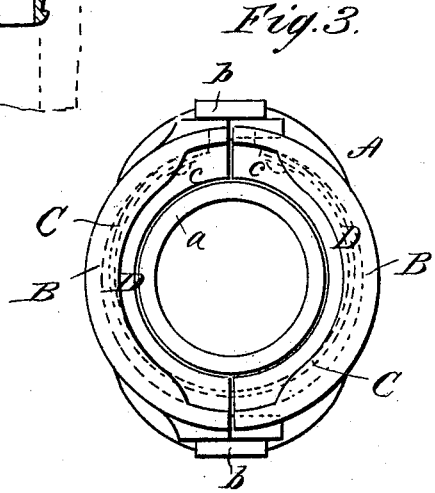

Figure 1 is a longitudinal sectional elevation of my improved hose-coupling. Fig. 2 is an end view of one section or part of the coupling, and Fig. 3 is an end view of the other part of the coupling with its spring indicated in dotted lines.

The coupling section or part A is made with a short metal tube $a$, to opposite sides of which the clamp-jaws B B of the coupling are pivoted on pins or gudgeons $b$ $b$. These jaws B B have a general semicircular form and encircle the outer end of the tube $a$, and in the space between the main bodies of the jaws and the tube there is placed a spring C, the two opposite ends of which are riveted to the opposite jaws B B at one side of the coupling. (See Figs. 1 and 3.) The jaws or hook members B B are provided with an interior flange or projection at a suitable distance from the hooks D D, said flange forming a stop for the hooks H of the mating section, as will be clearly seen in Fig. 1.

The spring C acts normally to draw the outer hooks D D at the outer ends of the jaws toward each other, and the hooks stand off a little from the outer end of the tube $a$, which they face, when the jaws are closed by the spring. An elongated aperture E, formed partly in each jaw B at one side of the coupling, and as shown in dotted lines in Fig. 1, allows insertion of a correspondingly-shaped key (not shown) to pry the jaws apart and open their hooks D D, this backward movement of the jaws and hooks on the pivots $b$ being limited by lugs $e$ $e$, cast on the tube $a$.

The opposite section or part F of the coupling is made with a ring or neck G, on which is formed an annular hook H, adapted to engage the hooks D of the jaws B, or rather to be engaged by the jaw-hooks when the two parts A F of the coupling are pushed together, the meeting faces of the opposing hooks D H being rounded over to insure automatic opening of the jaws B and engagement of the opposing hooks, as will be understood from Fig. 1 of the drawings.

Within the section F of the coupling there is securely held one end of a packing nipple or ring I, the other end of which, when the two parts of the coupling are hooked together, automatically enters the end of the tube $a$ of the opposite section A of the coupling and produces a tight joint, which the pressure of water through the coupling only serves to make the tighter. Hence there will be no leakage from the hose at the couplings.

The preferred method of attaching the ring-packing I to the coupling-section F is to turn an annular recess $f$ in the inner wall of part F and expand or force the end $i$ of the ring I into this recess by means of a soft-metal ring J, as in Fig. 1 of the drawings, but any other approved fastening for the packing-ring may be adopted and the packing may be made of rubber or any other suitable material.

An externally-ridged neck K is provided at the outer end of each section of the coupling to receive the lengths L of hose, (indicated in dotted lines in Fig. 1,) and collars M on the coupling-sections serve as stops to and guards for the ends of the hose, as will readily be understood.

Having thus fully described my invention, I claim as new and desire to secure by Letters Patent—

1. A coupling, comprising a pipe-section, hooks pivoted exteriorly on the said section and provided with interior shoulders to act as a stop for the end of a mating pipe-section, and means for pressing the hooks toward each other, substantially as shown and described.

2. A coupling, comprising a pipe-section, hooks pivoted exteriorly on said section and provided with recesses in their adjoining edges forming an opening to permit of the insertion of a tool to force the hook-sections from each other, and means for pressing the hooks toward each other, substantially as shown and described.

3. The combination with a pipe-section having hooks at one end and a packing-sleeve interiorly of the said hooks and spaced therefrom, of a mating pipe-section whose end is adapted to fit between the said hooks and packing-sleeve, said mating section having pivoted to it hooks adapted to surround the hooks of the other section, and means for pressing the pivoted hooks together, substantially as shown and described.

4. The combination with a pipe-section having hooks at one end, and an interior sleeve spaced from said hooks, of a mating section whose end is adapted to fit between said sleeve and hooks, said mating section having pivoted to it hook members arranged to surround the hook of the other section, and means for pressing the pivoted hooks toward each other, substantially as shown and described.

JOHN KERNS.

Witnesses:
  WERNER BRUNS,
  GEORGE ALTIN.